US010666861B2

(12) United States Patent
Sagas et al.

(10) Patent No.: US 10,666,861 B2
(45) Date of Patent: May 26, 2020

(54) METHOD AND SYSTEM FOR PRODUCING A VIDEO PRODUCTION

(71) Applicant: Mediaproduccion, S.L., Barcelona (ES)

(72) Inventors: Sergi Sagas, Barcelona (ES); Joan Bennassar, Sant Just Desvern (ES); Antoine Valverde, Barcelona (ES); Gerard Torrent, Barcelona (ES)

(73) Assignee: Mediaproduccion, S.L., Barcelona (ES)

( * ) Notice: Subject to any disclaimer, the term of this patent is extended or adjusted under 35 U.S.C. 154(b) by 0 days.

(21) Appl. No.: 14/915,021

(22) PCT Filed: Jul. 22, 2014

(86) PCT No.: PCT/EP2014/065715
§ 371 (c)(1),
(2) Date: Feb. 26, 2016

(87) PCT Pub. No.: WO2015/028203
PCT Pub. Date: Mar. 5, 2015

(65) Prior Publication Data

US 2016/0212337 A1 Jul. 21, 2016

(30) Foreign Application Priority Data

Aug. 29, 2013 (GB) .................................. 1315416.6

(51) Int. Cl.
*H04N 5/232* (2006.01)
*G06T 11/60* (2006.01)
(Continued)

(52) U.S. Cl.
CPC ......... *H04N 5/23238* (2013.01); *G06T 11/60* (2013.01); *H04N 5/222* (2013.01);
(Continued)

(58) Field of Classification Search
CPC ............ H04N 5/232; H04N 5/77; H04N 7/18; H04N 5/247; H04N 5/222; H04N 5/262;
(Continued)

(56) References Cited

U.S. PATENT DOCUMENTS 5,657,073 A 8/1997 Henley
6,788,333 B1 9/2004 Uyttendaele et al.
(Continued)

FOREIGN PATENT DOCUMENTS

EP 1480450 A2 11/2004
EP 2034441 A1 3/2009
(Continued)

OTHER PUBLICATIONS

Patent Examination Report No. 1 for Australian Application No. 2014314567 dated Nov. 11, 2016 (6 pages).
(Continued)

*Primary Examiner* — Thai Q Tran
*Assistant Examiner* — Nienru Yang
(74) *Attorney, Agent, or Firm* — Conley Rose, P.C.

(57) ABSTRACT

A method and system for generating a video production of an event that can be implemented automatically in real-time and with minimal operator intervention. The method includes receiving a plurality of video signals of an event. Each video signal includes a plurality of image frames. Each image frame corresponds to a view of the event. In addition, the method includes receiving at least one predefined condition associated with the event. Further, the method includes selecting a section of at least one of the plurality of image frames based on the at least one predefined condition to generate at least one output image frame. The method also includes generating a video production from the at least one output image frame.

12 Claims, 5 Drawing Sheets

C1
C2
C3
C4

(51) Int. Cl.

| | |
|---|---|
| ***H04N 5/247*** | (2006.01) |
| ***H04N 5/77*** | (2006.01) |
| ***H04N 7/18*** | (2006.01) |
| ***H04N 5/222*** | (2006.01) |
| ***H04N 5/262*** | (2006.01) |
| ***H04N 5/268*** | (2006.01) |

(52) U.S. Cl.
CPC ............. *H04N 5/247* (2013.01); *H04N 5/262* (2013.01); *H04N 5/268* (2013.01); *H04N 5/77* (2013.01); *H04N 7/181* (2013.01); *G06T 2207/10016* (2013.01); *G06T 2207/30221* (2013.01)

(58) Field of Classification Search
CPC .... H04N 5/268; H04N 5/23238; H04N 7/181; G06T 11/60; G06T 7/00; G06T 7/20; G06T 7/004; G06T 7/2053; G06T 7/70; G06T 7/254; G06T 2207/10016; G06T 2207/30221
USPC ............................................................ 348/38
See application file for complete search history.

(56) References Cited

U.S. PATENT DOCUMENTS

2002/0090217 A1 7/2002 Limor et al.
2002/0122113 A1 9/2002 Foote
2004/0233274 A1* 11/2004 Uyttendaele ....... H04N 5/23238 348/36
2007/0014347 A1* 1/2007 Prechtl ................... H04N 5/232 375/240.01
2007/0279494 A1 12/2007 Aman
2008/0143842 A1 6/2008 Gillard
2009/0059007 A1 3/2009 Wagg et al.
2011/0211036 A1* 9/2011 Tran ................... H04N 5/23238 348/14.08
2011/0234807 A1 9/2011 Jones et al.
2011/0299770 A1* 12/2011 Vaddadi ............... G06K 9/6211 382/165
2011/0317982 A1* 12/2011 Xu .................... G06F 17/30843 386/241
2012/0057852 A1* 3/2012 Devleeschouwer . G11B 27/034 386/278
2012/0098927 A1* 4/2012 Sablak ............ G08B 13/19604 348/36
2012/0155786 A1 6/2012 Zargarpour
2013/0070047 A1 3/2013 DiGiovanni et al.

FOREIGN PATENT DOCUMENTS

EP 2034747 A2 3/2009
EP 2525574 A1 11/2012
WO 2004/004320 A 1/2004
WO 2006/110584 A2 10/2006
WO 2008/004150 A2 1/2008
WO 2008/070687 A2 6/2008
WO 2010/036456 A2 4/2010

OTHER PUBLICATIONS

PCT/EP2014/065715 International Search Report and Written Opinion dated Dec. 9, 2014 (14 p.).
Article 19 Amendments for PCT/EP2014/065115 dated Feb. 10, 2015 (10 p.).
GB1315416.6 Search Report dated Feb. 21, 2014 (5 p.).
GB1315416.6 Search Report dated May 9, 2014 (3 p.).
European Patent Application No. 14742207.5 Examination Report dated Sep. 18, 2017 (9 pages).

* cited by examiner

METHOD AND SYSTEM FOR PRODUCING A VIDEO PRODUCTION

CROSS-REFERENCE TO RELATED APPLICATIONS

This application is a 35 U.S.C. § 371 national stage application of PCT/EP2014/065715 filed Jul. 22, 2014 and entitled "A Method and System for Producing a Video Production," which claims priority to British Application No. 1315416.6 filed Aug. 29, 2013 and entitled "A Method and System for Producing a Video Production," both of which are hereby incorporated herein by reference in their entirety for all purposes.

STATEMENT REGARDING FEDERALLY SPONSORED RESEARCH OR DEVELOPMENT

Not applicable.

BACKGROUND

The present invention relates to a method and a system for generating a video production.

In embodiments, the present invention relates in particular to a method and a system for generating a panoramic video for use to generate a video production of an event of public interest with minimal or no operator intervention and/or in real-time as an event occurs Television coverage of many events of public interest, including sporting events such as football (soccer) matches, typically requires many video cameras and many camera operators. In the example of a football (soccer) match, each cameraman operating a camera would follow the action on and off the playing field, either by panning or zooming the video camera to track the ball, players, or spectators as they move around on and off the playing field. The video signals of the captured images would then be transmitted to a control centre, where a director is able to view the images of each video signal. The director is also able to communicate with the cameramen to provide instruction for how a particular camera is to be operated and is able to select or combine the video signals to produce a presentation for broadcasting. Such a broadcast operation necessarily requires a large amount of manpower, equipment, and technical support; all of which adds to the financial costs of producing the broadcast. In particular, equipment such as wide-angle optics used to capture a wide field-of-view of an event can be prohibitively expensive.

For large scale events with sufficient financial backing, the large amount of resources required to produce a video broadcast is not a major concern. However, for small scale events or events with limited financial backing, the prohibitively high costs of broadcast production typically means that the event is not covered, and thus not televised.

For organisers of small scale events or events that do not enjoy wide spread popularity, being able to televise an event would in many cases increase the exposure of the event or organisers. In turn, the increase exposure attracts public interest, which can serve to raise the profile of the event and subsequently can be utilised to attract sponsors and funding.

There is therefore a need for an improved method and system for reducing the costs and resources need to produce a video production of an event that would be fit for broadcasting.

According to another aspect of the present invention, there is provided a method for generating a video production of an event, the method comprising: receiving a plurality of component video signals of an event, each component video signal comprising a plurality of component image frames, wherein each component image frame corresponds to a section of a panoramic view of the event; stitching the temporally corresponding component image frames of each video signal together to generate a plurality of panoramic image frames; selecting a section of each panoramic image frame based on at least one predefined condition associated with the event to generate a plurality of output image frames; generating a video production from the plurality of output image frames.

The present invention therefore provides a method that generates wide field-of view image frames without the need for expensive wide-angle optics. The method also enables a video production to be produced with minimal or no operator intervention and can be implemented automatically in real-time to capture video images of a wide variety of events.

In embodiments, one of the predefined conditions is to select a section of each panoramic image frame containing an area of interest associated with the event.

Alternatively or in addition, the step of selecting further includes identifying at least one image object in at least one image frame, and wherein one of the predefined conditions is to select a section of the at least one panoramic image frame containing the at least one image object. In particular, for more than one identified image objects in at least one panoramic image frame, the step of selecting further includes: determining the positions of the image objects in the at least one panoramic image frame; identifying the distribution of the positions over the at least one panoramic image frame; and determining a deviation of the identified distribution from an expected distribution associated with the event; wherein one of the predefined conditions is to select a section of the at least one panoramic image frame having a minimum deviation. By selecting a section that includes the image object, the method of these embodiments is able to simulate the effect of panning a video camera. Additionally, or alternatively, the method further comprises extracting background data from at least one of the panoramic image frames, wherein the step of identifying is based at least on the extracted background data. The method may also further comprise determining a density map of at least one of the panoramic image frames to indicate an area of the panoramic image frame where a large number of image objects are in close proximity to each other, wherein the step of identifying is based at least on the density map. The provisions of extracting background data and density mapping facilitates the step of identifying image objects against background features.

Preferably, the size of the selected section varies from one panoramic image frame to another. Alternatively or in addition, the position of the selected section relative to the corresponding panoramic image frame varies from one panoramic image frame to another. Varying the size and the position of the selected section further facilitate the simulation of the effect of zooming and panning of a video camera.

In other embodiments, the step of stitching further comprises correcting colour information of the component image frames of at least one component video signal relative to the component image frames of at least one other component video signal. The step of stitching may further comprise calibrating brightness levels of the component image frames of at least one component video signal relative to the component image frames of at least one other component video signal. These provisions enable the image frames to be stitched together seamlessly.

In some other embodiments, the method further comprises: generating metadata associated with the event; producing a visual element corresponding to the metadata; and incorporating the visual element into the video production. Alternatively or in addition, the method further comprises: receiving at least one audio signal; combining the at least one audio signal with the video production; and generating an audio-video production. These provisions enhance the video production by providing the viewer with additional information associated with the event.

According to another aspect of the present invention, there is provided a system for generating a video production of an event, the system comprising: a capture module operable to receive a plurality of component video signals of an event, each component video signal comprising a plurality of component image frames, wherein each component image frame corresponds to a section of a panoramic view of an event; a stitch module operable to stitch the temporally corresponding image frames of each video signal together to generate a plurality of panoramic image frames; a select module operable to select a section of each panoramic image frame based on at least one predefined condition associated with the event to generate a plurality of output image frames; a production module operable to generate a video production from the plurality of output image frames.

In embodiments, one of the predefined conditions is to select a section of each panoramic image frame containing an area of interest associated with the event.

Alternatively or in addition, the select module is operable to identify at least one image object in at least one panoramic image frame, and wherein one of the predefined conditions is to select the whole or a section of an image frame containing the at least one image object. In particular, for more than one identified image objects in at least one panoramic image frame, the select module is operable: to determine the positions of the image objects in the at least one panoramic image frame; to identify the distribution of the positions within the at least one panoramic image frame; and to determine a deviation of the identified distribution from an expected distribution; wherein one of the predefined conditions is to select a section of the at least one panoramic image frame having a minimum deviation. Additionally, or alternatively, the system further comprises an extraction module operable to extract background data from at least one of the panoramic image frames, wherein the select module is operable to evaluate the background data to identify the at least one image object. The system may also further comprise a mapping module operable to determine a density map of at least one of the panoramic image frames to indicate an area of the panoramic image frame where a large number of image objects are in close proximity to each other, wherein the select module is operable to evaluate the density map to identify the at least one image object Preferably, the size of the selected section varies from one panoramic image frame to another. Alternatively or in addition, the position of the selected section with respect to the corresponding panoramic image frame varies from one panoramic image frame to another.

In other embodiments, the stitch module is operable to correct colour information of the component image frames of at least one component video signal relative to the component image frames of at least one other component video signal. The stitch module may also be operable to calibrate brightness levels of the component image frames of at least one component video signal relative to at least one other component video signal.

In some other embodiments, the capture module is operable to generate metadata associated with the event; and the production module is operable to produce a visual element based on the metadata and to incorporate the visual element into the video production. Alternative or in addition, the production module is operable to: receive at least one audio signal; combine the at least one audio signal with the presentation; and generate an audio-video production.

According to another aspect of the present invention, there is provided a method for generating a video production of an event, the method comprising: receiving a plurality of video signals of an event, each video signal comprising a plurality of image frames, wherein each image frame corresponds to a view of the event; automatically identifying at least one image object in at least one image frame; automatically selecting the at least one image frame containing the at least one image object to generate a plurality of output image frames; and automatically generating a video production from the plurality of output image frames.

According to another aspect of the present invention, there is provided a system for generating a video production of an event, the system comprising: a capture module operable to receive a plurality of video signals of an event, each video signal comprising a plurality of image frames, wherein each image frame corresponds to a view of the event; a select module operable to automatically identify at least one image object in at least one image frame and to automatically select the at least one image frame containing the at least one image object to generate a plurality of output image frames; a production module operable to automatically generate a video production from the plurality of output image frames.

Embodiments of the present invention will hereinafter be described by way of examples, with references to the accompanying drawings, in which.

Figure 6A:
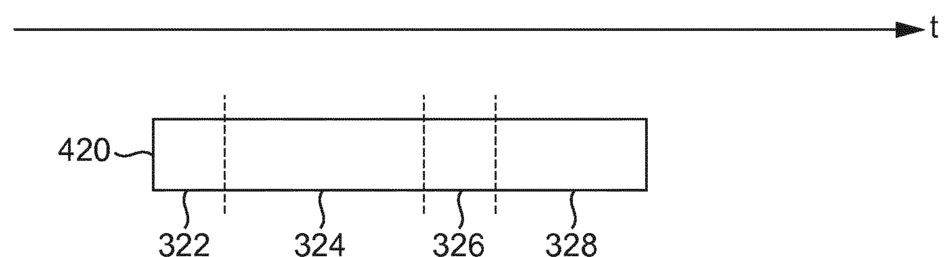
Figure 6B:
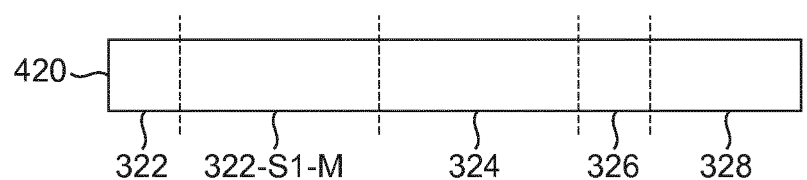
Figure 6C:
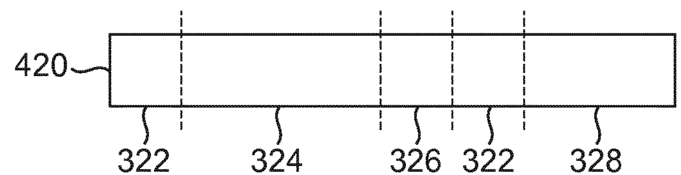

FIG. 6*a* to FIG. 6*c* are schematic illustrations of video productions.

Figure 2:
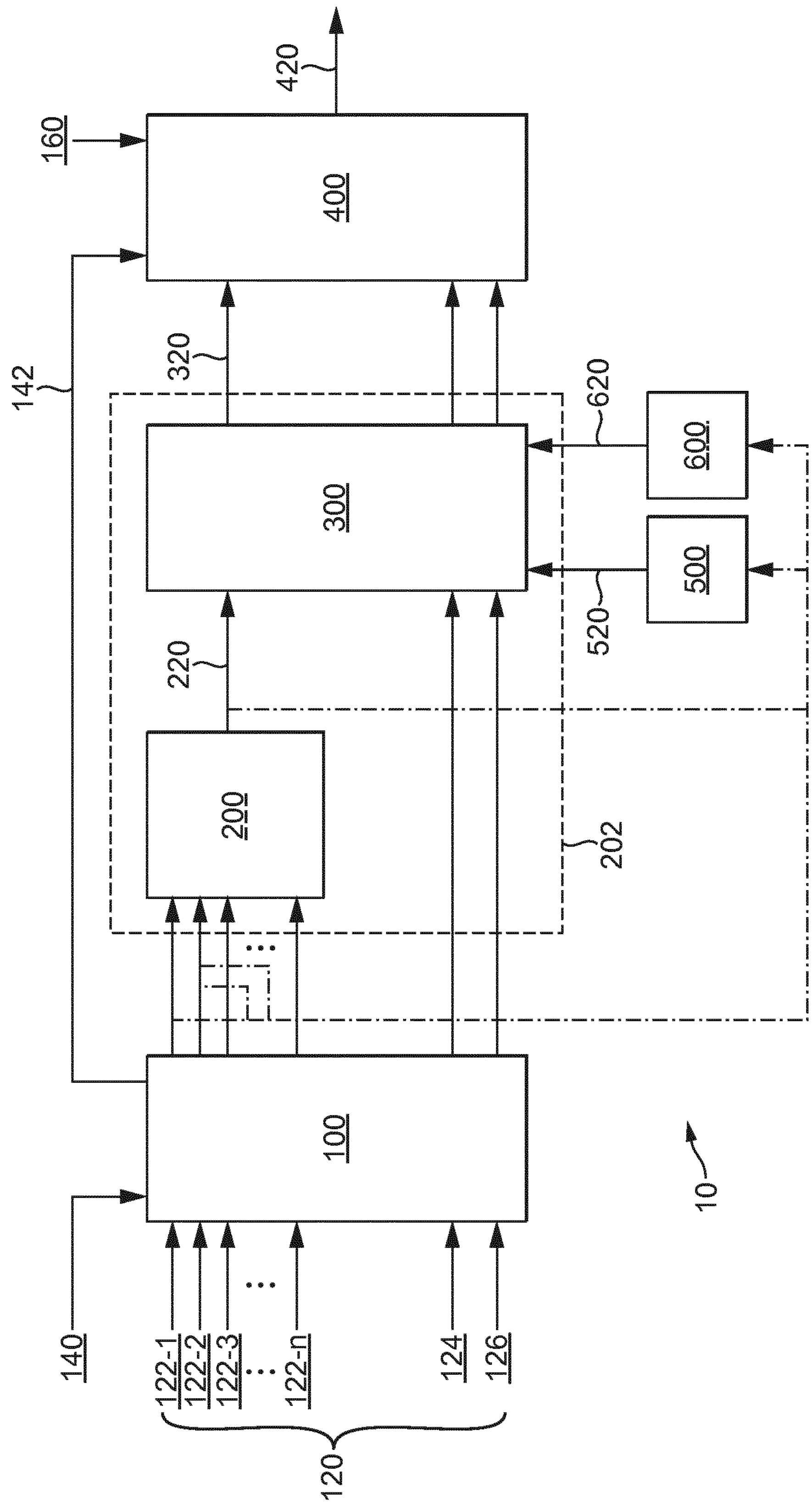
FIG. 2 is a schematic diagram of a system for generating a video production.

A system for generating a video production of an event in accordance with an embodiment of the present invention is shown in FIG. 2. In general, embodiments of the system of the present invention comprise a number of modules that are in communication with one another and can be implemented in computer hardware or software. The modules can also be implemented as individual modules or as sub-modules of a larger module. The system is arranged to receive video signal streams captured by a number of video cameras located at the geographic location where an event such as a football (soccer) match occurs.

Figure 1:
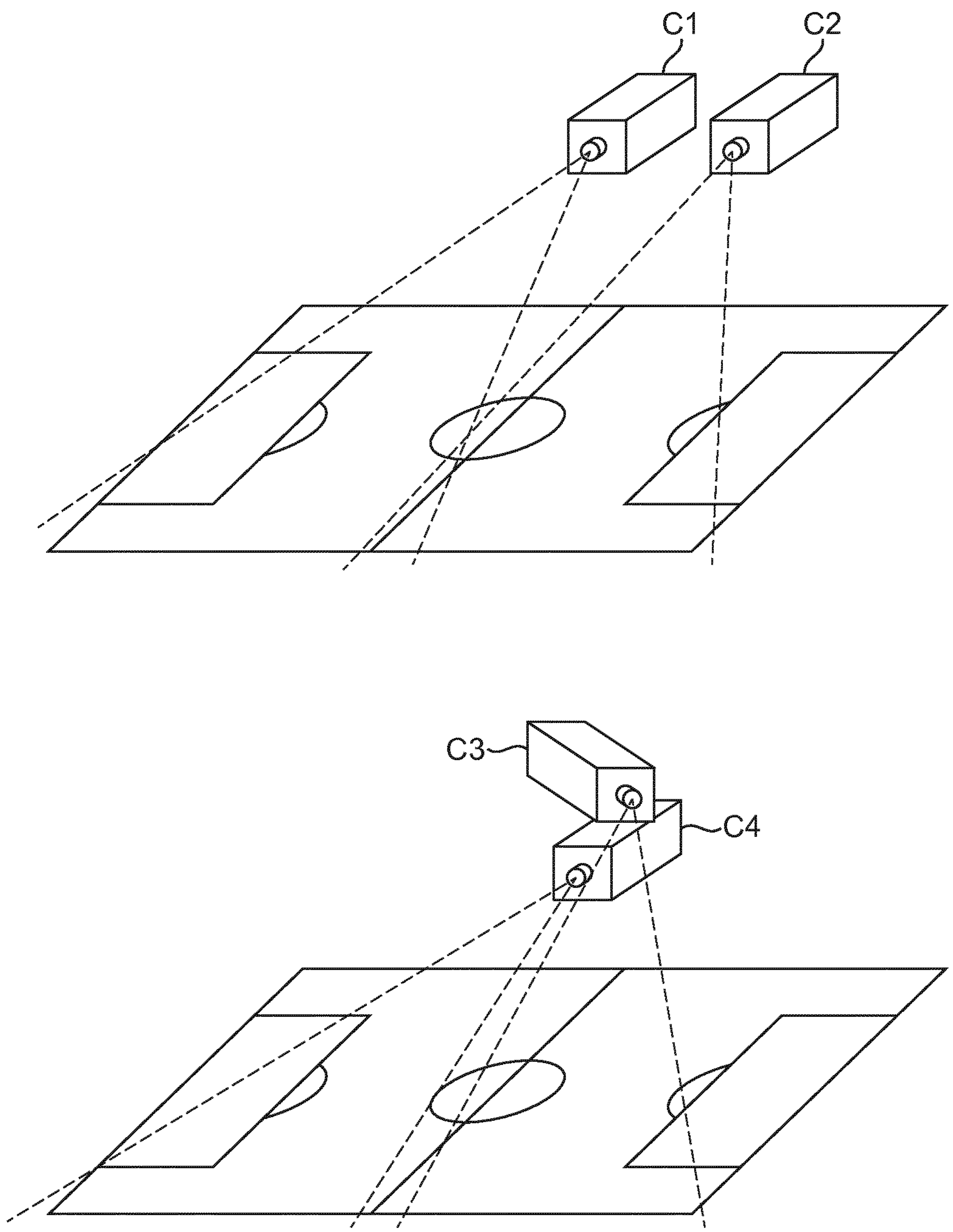
FIG. 1 is an illustration of two alternative video camera setups.

The video cameras may be operated remotely or locally with minimal human intervention so as to enable the system to produce a desired video production automatically in real-time. Indeed, once the system has been set up, it can operate as will be described below with no further operator intervention. In some embodiments, the video signal streams may be pre-recorded and received by the system subsequent to the occurrence of the event. In particular, as illustrated in FIG. 1, two video cameras may be placed in close proximity to each other, either side-by-side such as cameras C1 and C2 or in tandem such as cameras C3 and C4, so that the field-of-view of one camera C1 (C3) overlaps in part with the field-of-view of the other camera C2 (C4). The individual video streams may then be combined to generate a single video stream with a wide field-of view. More generally, a number of cameras may be deployed in a similar manner such that the wide field-of-view video stream generated covers the entire field of interest, such as the field of play of a football (soccer) match.

Subsequently, the wide field-of-view video stream may be manipulated. For example, for a certain portion of the video stream, the video stream may be manipulated by selecting a section of the field-of-view and further manipulated to shift the selected section from one image frame to another to simulate the effect of panning a video camera with the same field-of-view of that portion. Alternatively, or for another portion, the video stream may be manipulated by selecting a section, the size of which varies from image frame to image frame, to simulate the effect of zooming. The selected sections may then be cut and joined together to generate a video production for storage and/or broadcast.

It will therefore be appreciated that the wide field-of-view video stream can provide great flexibility and enables a variety of video productions to be produced from that video stream. The production of the video production occurs automatically once the system has been set up such that the significant cost and complexities of conventional systems, described above, can be avoided.

Referring now to FIG. 2, the system 10 of an embodiment of the present invention comprises a capture module 100, a stitch module 200, a select module 300, and a production module 400. As shown in this figure, each module is depicted as individual entities. However, it will be appreciated that some modules may be sub-modules of a larger module. For example, in some embodiments, the stitch module 200 and the select module 300 may be sub-modules of a virtual camera module 202. It will also be appreciated that the modules and sub-modules may be implemented in hardware or in software.

When an event such as a football (soccer) match takes place, a number of video cameras may be deployed in the manner described above to capture the event. In the embodiment shown in FIG. 2, the capture module 100 is configured to receive one or more video signals 120 captured by the video cameras, either in real-time directly from video cameras communicatively coupled to the capture module 100 or by means of pre-recording and storing the captured video signals. The capture module 100 is, in some embodiments, also configured to convert the received video signals 120 into an appropriate format suitable for use by the system 10.

As will be appreciated by a skilled person, a video signal can be analogue or digital, and comprises a series of image frames. It will also be appreciated by a skilled person that the image frames of a video signal each has an angle/field-of-view that depends on the characteristics of the optical components of the video camera, such as the focal length of the lens or the size of the imaging sensor.

In general, the video signals 120 received by the capture module 100 each comprises a number of image frames, where each image from corresponds to a view of the event that is being captured. Some of the video signals 120 received by the capture module 100, such as the component video signals 122-1 . . . **122-*n* shown in FIG. 2, may be associated with a panoramic field-of-view. That is to say, the image frames of a video signal received by the capture module 100 can be joined or stitched to the temporally corresponding image frames of another video signal to generate a panoramic video signal, where the image frames of the panoramic video signal have a field-of-view that is wider than the field-of-view of the image frames of each of the individual video signals. The component video signals 122-1 . . . 122-*n*** may be obtained from a number of video cameras, placed side-by-side adjacent each other or in tandem one above the other, and aligned such that an edge of the field-of-view of one camera corresponds to an edge of the field-of-view of the adjacent camera or such that the field-of-view of one camera partially overlaps with the field-of-view of the adjacent camera.

Figure 3:
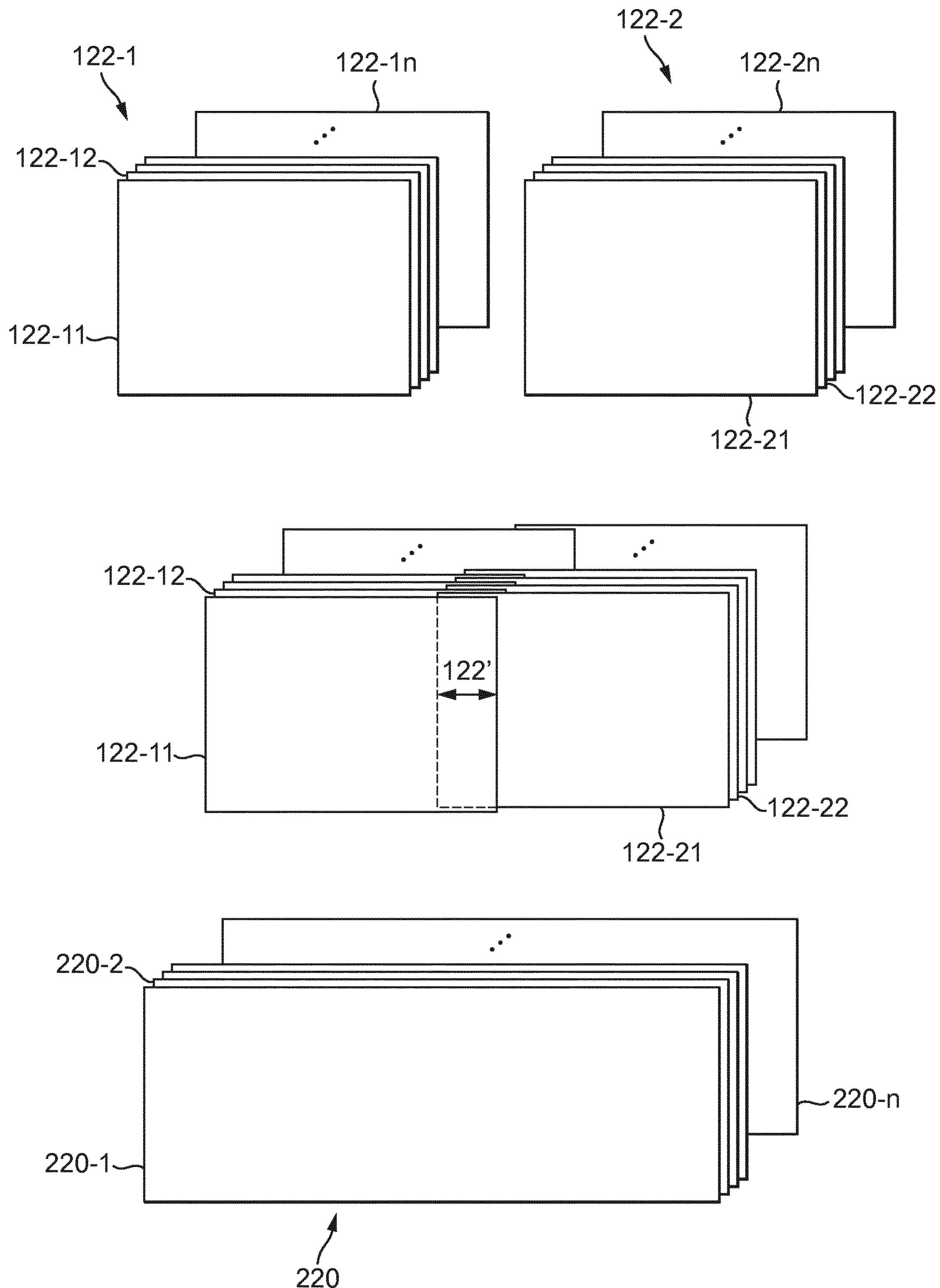
FIG. 3 is a schematic illustration of the image frames of one video signal being stitched to the image frames of another video signal.

As shown in FIG. 2, the capture module 100 is arranged to be operable to receive one or more component video signals 122-1 . . . **122-*n*, each of which is associated with a panoramic field-of-view. Once received, the component video signals 122-1 . . . 122-*n* may, in some embodiments, undergo one or more pre-processing steps such as colour correction and calibration to equalize the colour hue and brightness levels of each video signal. Thereafter, the component video signals 122-1 . . . 122-*n* are passed to the stitch module 200, which is arranged to be operable to combine the corresponding image frames of the component video signals 122-1 . . . 122-*n* to generate a panoramic video signal. For example, in some embodiments, the stitch module 200 receives the component video signals 122-1 . . . 122-*n* and is operable to stitch together the image frames of one component video signal with the temporally corresponding image frames of the other component video signals by any suitable method, such as using homography or the zero-parallax technique, to generate panoramic image frames for the panoramic video signal 220. FIG. 3** illustrates schematically the stitching together of two temporally corresponding image frames.

In FIG. 3, an example of two component video signals, component video signal 122-1 made up of component image frames 122-11 . . . **122-1*n* and component video signal 122-2 made up of component image frames 122-21 . . . 122-2*n*, are shown schematically. In these examples, component image frames 122-1*a* . . . 122-1*n* cover a particular field-of-view and component image frames 122-21 . . . 122-*n* cover a field-of-view that overlaps with the field-of-view of image frames 122-11 . . . 122-1*n* by a small portion. In the stitching process, the component image frames of component video signal 122-1 are joined with the temporally corresponding component image frames of component video signal 122-2 at the overlapping portion to generate panoramic image frames 220-1 . . . 220-*n* for a panoramic video signal 220. As an illustration, FIG. 3 shows component image frame 122-11 depicting a scene at a particular time and component image frame 122-21 depicting another scene at the same moment in time as component image frame 122-21, overlapping at portion 122'. In the stitching process, component image frame 122-11 and component image frame 122-21 are stitched together at the overlapping portion 122' to generate a panoramic image frame 220-1 of the panoramic video signal 220. The other panoramic image frames 220-2 . . . 220-*n* of panoramic video signal 220** are then generated in a similar manner.

In some embodiments, component video signal 122-1 and component video signal 122-2 may undergo one or more pre-process steps. For example, the exposure settings of the camera used to capture component video signal 122-1 may differ by a small amount from that of the video camera used to capture component video signal 122-2. In such a case, it will be desirable to adjust the images depicted in the respective video signals relative to each other so as to enable image frames to be seamlessly joined together. Accordingly, in these embodiments, the stitch module 200 is arranged to be operable to correct the colour information of the component image frames of the component video signals that are to be stitched together. In addition, or alternatively, the stitch module 200 is also arranged to be operable to calibrate the brightness levels of the component image frames of the video signals that are to be stitched together. Correcting the colour information and calibrating the brightness levels prior to stitching the image frames together then ensures that the colours and brightness levels on one side of the panoramic image frame matches those on the other side of the panoramic image frame so that the seam at which the image frames are joined is as imperceptible as possible.

It will be appreciated that, although only two component video signals 122-1, 122-2 are shown in FIG. 3, any number of suitably aligned component video signals 122-1 . . . **122-*n* may be stitched together to generate the panoramic video signal 220**. It will also be appreciated that more than one panoramic video signal may be generated in the same manner.

Referring back to FIG. 2, once the panoramic video signal 220 has been generated, it is passed to the select module 300. The select module 300 is arranged to manipulate the video signals it receives according to predefined rules and conditions that are associated with an event. For example, the panoramic image frames 220-1 . . . **220-*n* may depict the actions of a football (soccer) match, and the predefined rules and conditions may be a requirement to simulate the effect of tracking the movement of a football depicted in the panoramic image frames 220-1 . . . 220-*n*** for a certain period of time.

Figure 4:
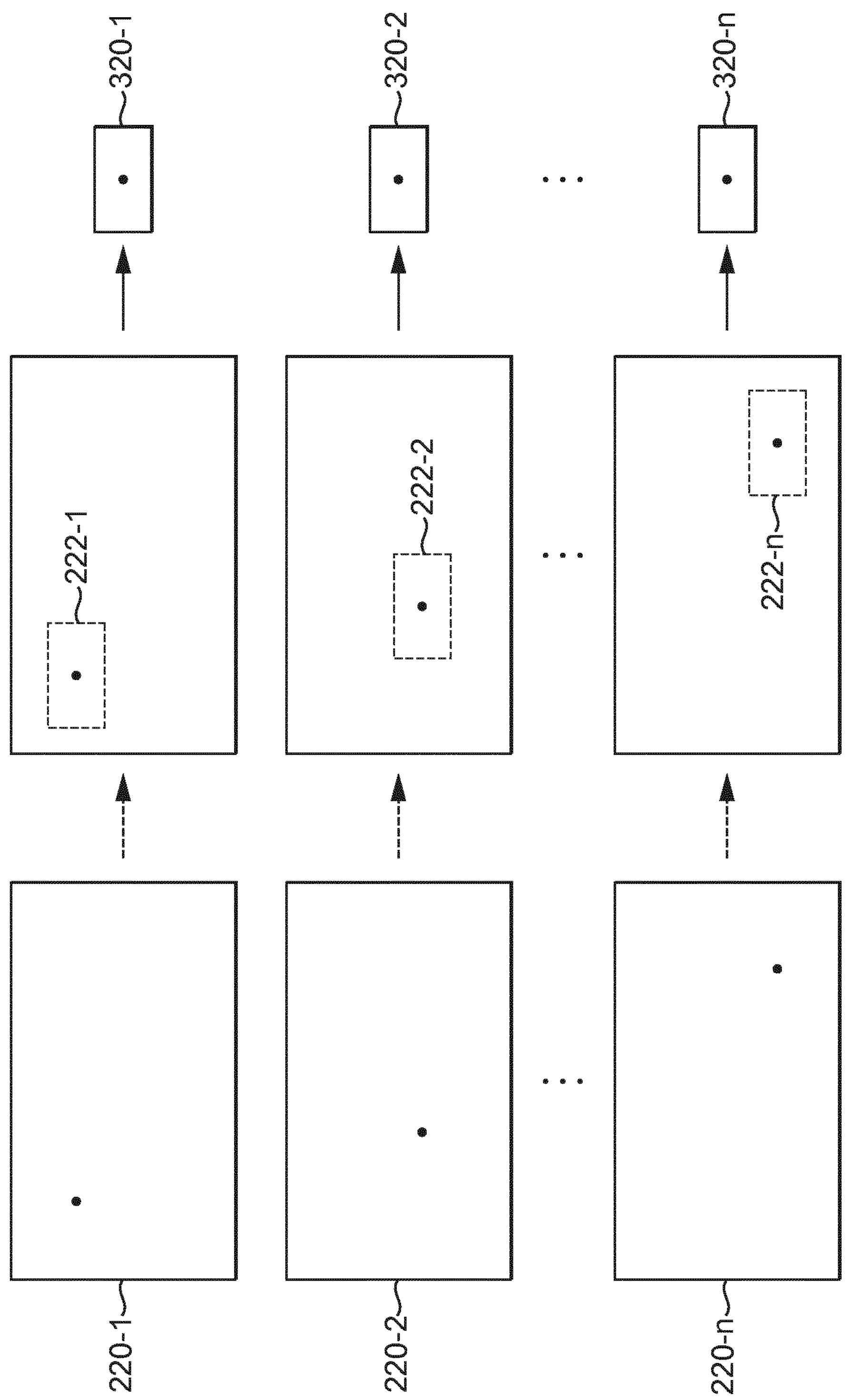
FIG. 4 is a schematic illustration of selecting a section of the panoramic images frames.

As an illustration, FIG. 4 shows panoramic image frames 220-1 . . . **220*n*, depicting a scene having a football that changes position from frame to frame. The select module 300 is operable to analyse the panoramic image frames 220-1 . . . 220-*n* using any suitable image analysis and tracking methods to identify the football as a moving object and determines its position within each image frame. Based on the position, the select module 300 is then able to determine the trajectory of the football. Then, by setting one of the predefined conditions as to select a section of the image frame to include the football, the select module 300 is able to simulate the effect of tracking the football by selecting a section that includes the football located at a particular relative position in each section. Generally, based on at least one predefined condition associated with the event that is being captured, the select module 300 is operable to select the whole or a section of any number of image frames of any number of video signals it receives to generate a corresponding number of output image frames. As an illustration shown in FIG. 4, the select module 300 in some embodiments is operable to identify the football in panoramic image frame 220-1, to select section 222-1 to include the football, and to extract section 222-1 to generate a separate output image frame 320-1. Similarly, the same procedure can be applied to the other panoramic image frames to generate output image frames 320-2 . . . 320-*n* to form an output video signal 320**.

Although only one image object is shown in FIG. 4, it will be appreciated that the predefined rules and conditions are not limited to tracking one moving image object and the select module 300 may be operable to track more than one image object. It will also be appreciated that the select module 300 may be operable to track any number of image objects or area of interest. In addition, the select module 300 of some embodiments may also be operable to determine the positions of the image objects in the panoramic image frames and to identify how these image objects are distributed over the panoramic image frame. Then, for events where the image objects have an expected distribution, the select module is operable to determine the deviation of the distribution of the positions of the image objects from the expected distribution. One of the predefined conditions can then be set as to select a section where the deviation is at a minimum. For example, the select module 300 may be able to identify the movement of spectators in a football stadium as moving objects and to identify that the distribution of the movement of spectators to match that of a Mexican wave travelling around the stadium. In such an example, the select 300 module is operable to select sections of the panoramic image frames to track the movement of the Mexican wave.

It will be appreciated that by selecting a section 221-1 . . . **222-*n* of the panoramic image frames 220-1 . . . 220-*n* to include a moving object, the effect that would be observed in the output image frames 320-1 . . . 320-*n* would be equivalent to video images captured by panning a video camera that has the same field-of-view as the output image frames 320-1 . . . 320-*n*. In some embodiments, the select module 300 may be further arranged to vary the size of the selected section so as to simulate the effect of zooming. For example, the select module 300** may be arranged to select a progressively smaller section to create the effect of zooming in or progressively larger sections to create the effect of zooming out.

Referring back to FIG. 2, to facilitate the task of identifying objects or area of interest in the panoramic image frames 220-1 . . . **220-*n* received by the select module 300, the system 10 of some embodiments further includes an extraction module 500 and a mapping module 600**.

The extraction module 500 is arranged to be operable to identify features either in the image frames of the panoramic image signal 220 or in the component video signals 122-1 . . . **122-*n* that are associated with the background and to extract image data 520 that represent these features. The background image data 520 are then communicated to the select module 300 for evaluation so as to facilitate the select module 300** to distinguish between image objects in the foreground and the background features.

The mapping module 600 is arranged to be operable to analyse either the image frames of the panoramic image signal 220 or in the component video signals 122-1 . . . **122-*n* to identify one or more image objects that are of interest. Once the image objects are identified, the mapping module 600 determines the positions of the image objects, generates a density map 620, and assigns an indicator in the density map 620 such as a colour to indicate an area of the image frame where a large number of image objects are in close proximity to each other. Similarly, the mapping module 600 may also assign an indicator in the density map 620 to indicate an area of the image frame where there are few or no image objects. The completed density map 620 is then communicated to the select module 300 for evaluation so as to facilitate the select module 300 to distinguish between image objects in the foreground and the background features and to facilitate the select module 300** to determine how the image objects are distributed over the image frames.

It will be appreciated that the extraction module 500 may be implemented in conjunction with the mapping module 600. It will also be appreciated that the extraction module 500 may be implemented as an alternative to the mapping module and vice versa.

Figure 5:
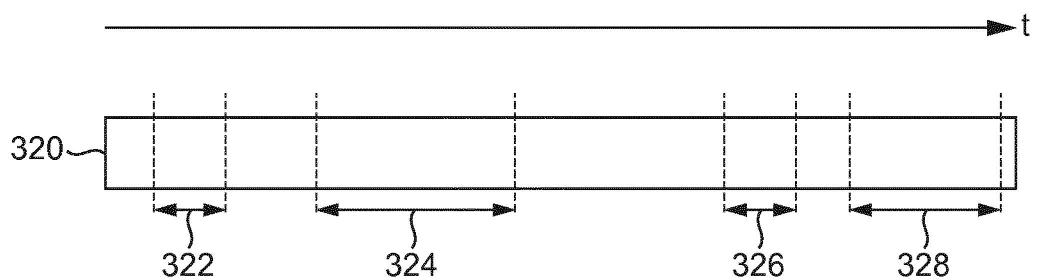
FIG. 5 is a schematic illustration of an output video signal.

Referring still to FIG. 2, once the output video signal 320 is generated, it is passed to the production module 400 for editing. For example, it may be undesirable to include the whole length of the output video signal 320 for broadcast. In such an example, it may be desirable to include only a portion, or some portions of the output video signal 320. Accordingly, the production module 400 is arranged to be operable to select some or all of the output image frames 320-1 . . . 320-*n* to generate a video production 420. In embodiments, as illustrated in FIG. 5, the production module 400 is operable to select the output image frames from different segments of the output video signal 320 and to combine the segments to produce the video production 420. As shown in FIG. 5, the output video signal 320 includes desirable segments 322, 324, 326, 328 separated by undesirable segments. The production module 400 is operable to extract the output image frames of these segments and to combine them to produce the video production 420 as shown in FIG. 6*a*.

In some embodiments, it may be desirable to have one or more segments repeated either immediately or at a subsequent time. It may also be desirable to repeat a segment in slow motion. Accordingly, in some embodiments, illustrated in FIG. 6*b* and FIG. 6*c*, the production module is operable to generate a video production with one or more segments 322 repeated as a slow motion segment 322-SloMo, or a segment 322 repeated subsequent to one or more different segment.

More generally, the production module 400 is operable to generate a video production from output image frames it receives.

Referring back to FIG. 2, once the video production 420 is generated, it may be sent directly to broadcast or it may be sent to storage or further processing before broadcast.

In some cases, the event that is to be covered may have secondary data associated with the captured video signals, and it may be desirable to incorporate these into the video production 420 to enhance the viewing experience. For instance, it may be desirable to incorporate the running time and score line of a football (soccer) match into the video production so that a viewer can follow the action with the knowledge of the scores. Accordingly, as shown in FIG. 2, the capture module 100 of some embodiments is further arranged to be operable to receive secondary information 140 associated the event. Secondary information 140 may, for example, be gathered from external sensors, timing devices, score keeping devices, or any other suitable means. The capture module 140 then generates metadata 142 associated with the secondary information 140 and communicates the metadata 142 to the production module 400. The production module 400 is operable to produce a visual element, such as an element that displays the scores and running time of a football (soccer) match at the corner of an image frame, and to incorporate the visual element into the video production.

In other cases, it may also be desirable to incorporate audio information into the video production 420. Accordingly, in some embodiments of the system 10 described above, the production module 400 is arranged to be operable to receive one or more audio signals 160 and is operable to incorporate the audio signals 160 into the video production 420.

In some alternative embodiments, the capture module 100 is also operable to receive video signals from individual video cameras that are not associated with a panoramic field-of-view, such as video signals 124, 126 shown in FIG. 2. In these embodiments, these video signals 124, 126 are passed to the select module 200, bypassing the stitch module 300. Once received by the select module 300, it will be appreciated these video signals 124, 126 would be handled in a similar manner to that described above for the panoramic video signal 220.

By utilizing panoramic video image frames generated as described above, and simulating the effect of panning and zooming, embodiments of the present invention is able to generate a video present from fixed cameras that require little to no operator intervention. The utilization of panoramic video image frames as herein described also provides videos with a wide field-of-view without the need to use expensive wide-angle optics. The method and system may be pre-configured to operate automatically and in real-time so as to minimize the requirement on resources.

In other different embodiments of the system 10, the select module 300 is further operable to receive and store the predefined rules and conditions that are used to generate the video production. In particular, the select module 300 receives and stores predefined conditions that are associated with the event that is to be captured. The predefined conditions can be implemented in hardware or software, and can be loaded to the system 10 during or after assembly. Once video signals are received from the stitch module 200 or from the capture module 100, the select module 300 selects the whole or a section of an image frame from any suitable number of the image frames of the received video signals based on the predefined conditions. When making the selection, the select module 300 is optionally operable to track the movement, colour, brightness, and contrast of any number of objects depicted in the image frame. The selected image frames and/or section of image frames are communicated to the production module 400 as output image frames of an output video signal 320. The production module 400 then uses the output video signal 320 to generate a video production 420.

Optionally, video signals from the stitch module 200 or the capture module 100 are communicated to the extraction module 500 and to the mapping module 600, as well as to the select module 300.

The extraction module 500 is operable to analyse the image frames of the received video signals and to identify features in the image frames that are associated with the background of the event that is being captured. Image data 520 representing these background features are extracted from the received video signals and are communicated to the select module 300. The select module 300 evaluates the image data 520 alongside the video signals it receives when making the selection. The image data 520 enables the select module 300 to identify any object that is moving relative to the background more readily, thus facilitates the generation of the video production 420 in real-time.

The mapping module 600 is operable to analyse the image frames of the received signals and to identify one or more image objects that are of interest. Once the image objects are identified, the mapping module 600 determines the positions of the image objects, generates a density map 620, and assigns an indicator in the density map 620 such as a colour to indicate an area of the image frame where a large number of image objects are in close proximity to each other. Similarly, the mapping module 600 may also assign an indicator in the density map 620 to indicate an area of the image frame where there are few or no image objects. The completed density map 620 is then communicated to the select module 300 for evaluation so as to facilitate the select module 300 to distinguish between image objects in the foreground and the background features and to facilitate the select module 300 to determine how the image objects are distributed over the image frames.

In these different embodiments, the predefined rules and conditions generally relate to physical attributes and aspects of the event that is to be captured. For example, where the event to be captured is a football (soccer) match, it is inherent that the event comprises two teams of eleven players each, a referee, and a ball. In this example, the select module 300 is operable to identify the players, referee, and the football based on their shapes and colours. Additionally, the action of a football match typically occurs within a certain distance of the football. Accordingly, an example of a predefined condition is to select a section of the image frame that includes the football and the area within a predetermined distance surrounding the football. The action may also occur where there is a certain number of players of one of the teams (i.e. objects that are all of a certain colour) within a certain distance of the football, such as during a counter-attack. Accordingly, another example of a predefined condition is to select a section of the image frame that contains a certain number of players of one team within a predetermined distance of the football as compared to the number of players of the other team. Other examples of a predefined condition include, but are not limited to, selecting a section of the image frame that contains one or more specific players, selecting a section of the image frame within which the football is at the same position, and selecting a section of the image frame that includes the referee. More generally, and as it will be appreciated by the skilled person, these examples of predefined conditions can be adapted for other sporting events such as, but not limited to, rugby, golf, tennis, basketball, hockey, cricket, volleyball, American football, and baseball.

It is also inherent to some events that the action occurs in a field or area with known dimensions and markings. For example, where the event to be captured is a race, it is inherent that the image objects, i.e. competitors such as athletes, race horses, racing cars, racing motorbikes, racing bicycles, or any other racing vehicles, move and follow a predetermined path, such as the track of a racing course or circuit. Accordingly, another example of a predefined condition is to select a section of the image frame that includes at least one image object whilst following a predetermined path. It may also be that the most interesting action of the race is characterised by a large proportion of the competitors being in a small section of the track of the racing circuit. Accordingly, another example of a predefined condition is to select a section of the image frame that has the highest density of image objects. Optionally, the select module 300 is operable to distinguish different image objects, such as moving vehicles, based on their colours and contrast, and another example of a predefined condition is to select a section of the image frame that includes any one or group of image objects out a plurality of image objects.

In other examples of these different embodiments, the event to be captured is characterised by variations in brightness over the area of the image frame. For example, for events such as plays, operas, or any other stage performances, the action is generally characterised by regions of relatively high brightness, such as spotlights directed towards an area of a theatre stage. Accordingly, another example of a predefined condition is to select a section of the image frame that includes bright regions that correspond to spotlighting. In these examples, the image objects in the image frames may be anatomic features of the actors/singers on the theatre stage and the action is characterised by facial movements of the actors/singers, such as lip movements. Accordingly, the select module 300 is operable to identify these facial movements by analysing the colour and/or contrast of the received image frames, and another example of a predefine condition is to select a section of the image frame that includes at least one of the identified facial movements.

In these different embodiments, it may be that more than one predefined conditions are met in a given image frame. Accordingly, the predefined conditions of these embodiments are optionally ranked. If the image frames received by the select module 300 satisfy more than one predefined conditions, the select module 300 generates the video production 420 based on the highest ranked predefined condition. It will also be appreciated that the above-described predefined conditions may be implemented individually or collectively in any suitable combination. Further, it will be appreciated that some of the above-described predefined conditions are more suitable than others depending on the intended end-user of the video production 420. Accordingly, these more suitable predefined conditions are implemented for the particular intended end-user. For example, where the intended end-user of the video production 420 is a coach of a football team, it is more desirable for the video production 420 to include image frames that include the whole area of a football field to enable to coach to analyse all aspects of a football match. In such an example, a preferred predefine condition is to select a section of the image frames that contain the whole area of a football field. In another example, where the intended end-user is a football scout interested in one particular player, it is more desirable for the video production 420 to include image frames that contain that particular player. In such an example, a preferred predefined condition is to select a section of the image frames that contain a particular image object.

In these different embodiments, the system 10 of the present invention is able to produce video productions of events that include the effects of panning and zooming automatically with minimal human intervention. By generating the video production 420 based on the above-described predefined conditions, the system 10 is able to determine the section of an image frame of a received video signal that is to be included in the video production 420 without the further human input.

In the foregoing embodiments of the present invention, the method and system for generating a video production have been described as suitable for events of public interest, such as football matches. It will be appreciated by the skilled person that the present invention is not limited to events of public interest and is also suitable for other events. It will also be appreciated that the purpose of the video production is not limited to broadcast and may be for other purposes, including streaming and private viewing.

Embodiments of the present invention have been described with particular reference to the examples illustrated. However, it will be appreciated that variations and modifications may be made to the examples described within the scope of the appending claims.

The invention claimed is:

1. A method for generating a video production of an event, the method comprising:

receiving a plurality of component video signals of an event, each component video signal comprising a plurality of component image frames, wherein each component image frame corresponds to a section of a panoramic view of the event;

stitching the temporally corresponding component image frames of each component video signals together to generate a plurality of panoramic image frames;

extracting background data from the at least one panoramic image frame;

determining a density map of image objects of the at least one panoramic image frame to indicate an area of the panoramic image frame where a large number of image objects are in close proximity to each other;

receiving predefined rules and conditions associated with the event;

selecting a section of each panoramic image frame based on the received predefined rules and conditions, including identifying a plurality of image objects in at least one panoramic image frame, wherein one of the predefined rules and conditions is to select a section of the at least one panoramic image frame containing the image objects, to generate a plurality of output image frames; and generating a video production from the plurality of output image frames;

wherein the step of identifying is based at least on the extracted background data; and wherein the step of selecting is based at least on the density map.

2. A method as claimed in claim 1, wherein the step of selecting further includes determining the speed at which the identified image objects move from one panoramic image frame to another, wherein one of the received predefined rules and conditions is to select a section of the at least one panoramic image frame based on the determined speed of the image object.

3. A method as claimed in claim 1, wherein, the step of selecting further includes:

determining the positions of the image objects in the at least one panoramic image frame;

identifying the distribution of the positions over the at least one panoramic image frame; and determining a deviation of the identified distribution from an expected distribution associated with the event;

wherein one of the received predefined rules and conditions is to select a section of the at least one panoramic image frame having a minimum deviation.

4. A method as claimed in claim 1, wherein the size of the selected section varies from one panoramic image frame to another.

5. A method as claimed in claim 1, further comprising generating metadata associated with the event;

producing a visual element corresponding to the metadata; and incorporating the visual element into the video production.

6. A method as claimed in claim 1, further comprising:

receiving at least one audio signal;

combining the at least one audio signal with the video production; and generating an audio-video production.

7. A system for generating a video production of an event, the system comprising:

a capture module operable to receive a plurality of component video signals of an event, each component video signal comprising a plurality of component image frames, wherein each component image frame corresponds to a section of a panoramic view of the event;

a stitch module operable to stitch the temporally corresponding component image frames of each component video signals together to generate a plurality of panoramic image frames;

an extraction module operable to extract background data from at least one of the panoramic image frames;

a mapping module operable to determine a density map of image objects of at least one of the panoramic image frames to indicate an area of the panoramic image frame where a large number of image objects are in close proximity to each other;

a select module operable to receive predefined rules and conditions associated with the event, and operable to select a section of each panoramic image frame based on the received predefined rules and conditions to generate a plurality of output image frames, wherein the select module is operable to identify a plurality of image objects in at least one panoramic image frame and wherein one of the predefined rules and conditions is to select a section of the at least one panoramic image frame containing the image objects; and a production module operable to generate a video production from the plurality of output image frames;

wherein the select module is operable to evaluate the background data to identify the image objects;

wherein the select module is operable to evaluate the density map to select the section of each panoramic image frame.

8. A system as claimed in claim 7, wherein the select module is operable to determine the speed at which the identified image object moves from one panoramic image frame to another, wherein one of the received predefined rules and conditions is to select a section of the at least one panoramic image frame based on the determined speed of the at least one image object.

9. A system as claimed in claim 7, wherein, the select module is operable:

to determine the positions of the image objects in the at least one image frame;

to identify the distribution of the positions within the at least one panoramic image frame; and to determine a deviation of the identified distribution from an expected distribution;

wherein one of the received predefined rules and conditions is to select a section of the at least one panoramic image frame having a minimum deviation.

10. A system as claimed in claim 7, wherein the size of the selected section varies from one image frame to another.

11. A system as claimed in claim 7, wherein:

the capture module is operable to generate metadata associated with the event; and the production module is operable to produce a visual element based on the metadata and to incorporate the visual element into the video production.

12. A system as claimed in claim 7, wherein the production module is operable to:

receive at least one audio signal;

combine the at least one audio signal with the video production; and generate an audio-video production.

* * * * *